(No Model.)  A. S. & E. HOUCK.  3 Sheets—Sheet 2.
CORN PLANTER.

No. 320,063.  Patented June 16, 1885.

Witnesses:
T. Walter Fowler
DeWitt P. Cowl

Inventors;
Austin S. Houck
Edwin Houck
per attys.
A. H. Evans & Co.

(No Model.) 3 Sheets—Sheet 3.

A. S. & E. HOUCK.
CORN PLANTER.

No. 320,063. Patented June 16, 1885.

Witnesses:
T. Walter Fowler
Dumont P. Towl

Inventors:
Austin S. Houck
Edwin Houck
per Attys.
A. H. Evans & Co.

UNITED STATES PATENT OFFICE.

AUSTIN S. HOUCK AND EDWIN HOUCK, OF BEDFORD, IOWA.

CORN-PLANTER.

SPECIFICATION forming part of Letters Patent No. 320,063, dated June 16, 1885.

Application filed January 8, 1885. (No model.)

*To all whom it may concern:*

Be it known that we, AUSTIN S. HOUCK and EDWIN HOUCK, citizens of the United States, residing at Bedford, in the county of Taylor and State of Iowa, have invented certain new and useful Improvements in Corn-Planters, of which the following is a full, clear, and exact description, reference being had to the accompanying drawings, forming part of this specification, in which—

Figure 1:
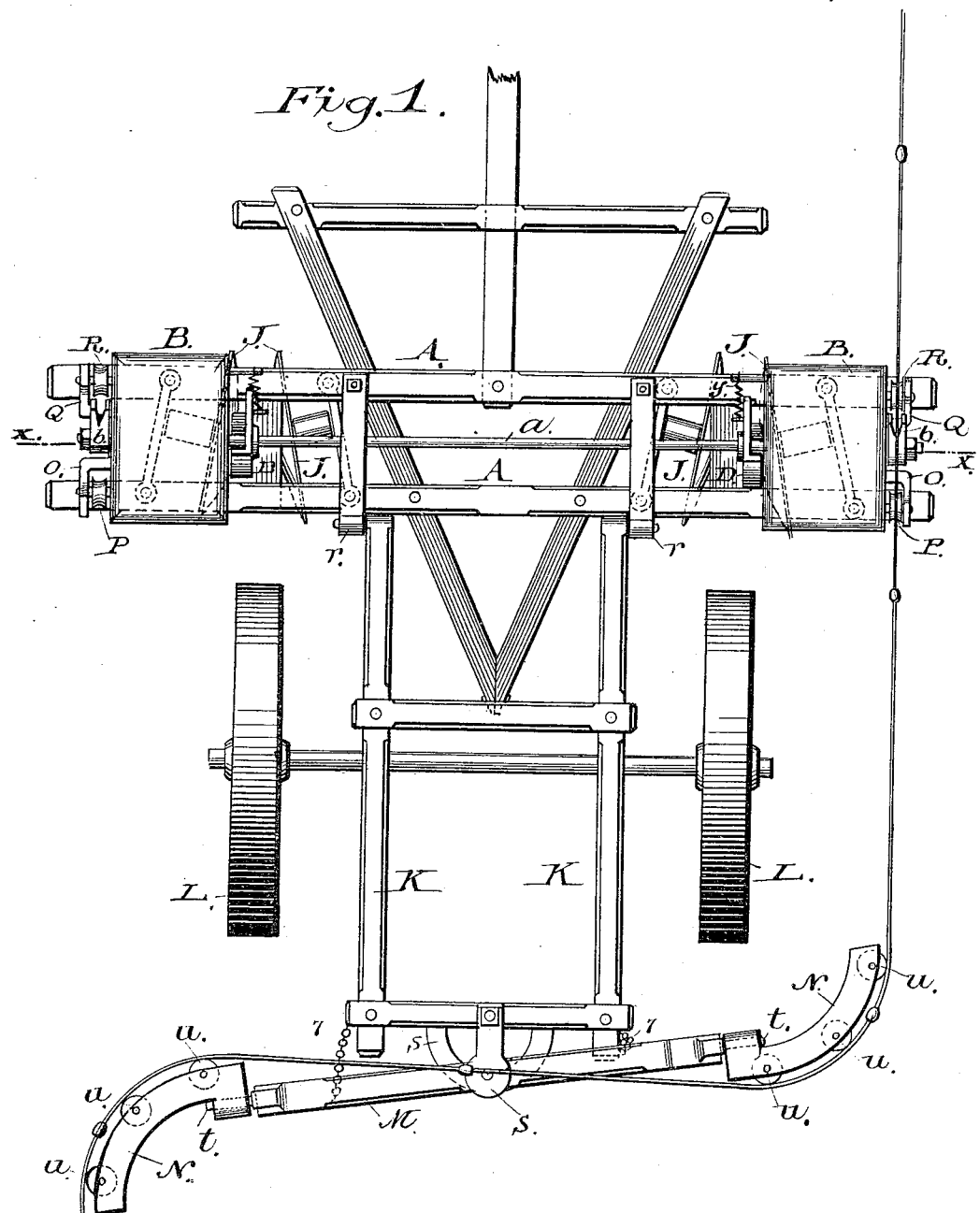
Figure 2:
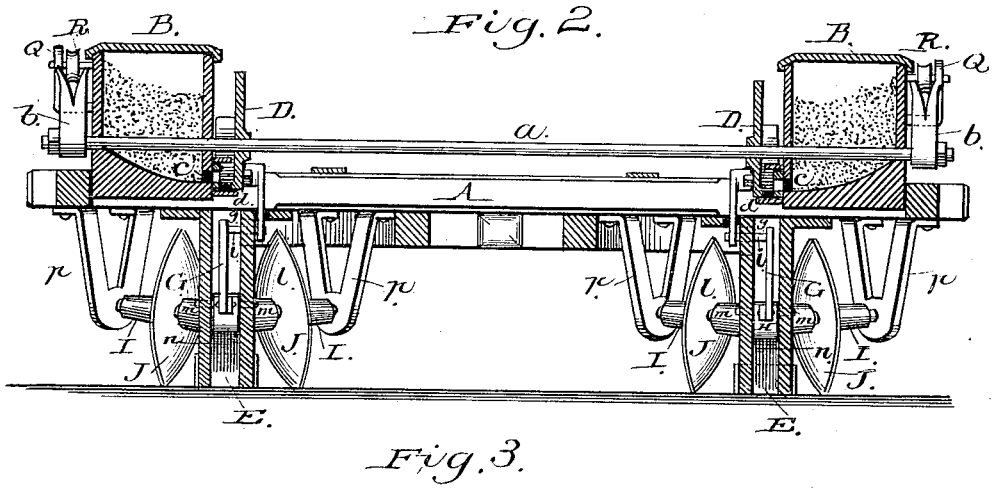
Figure 3:
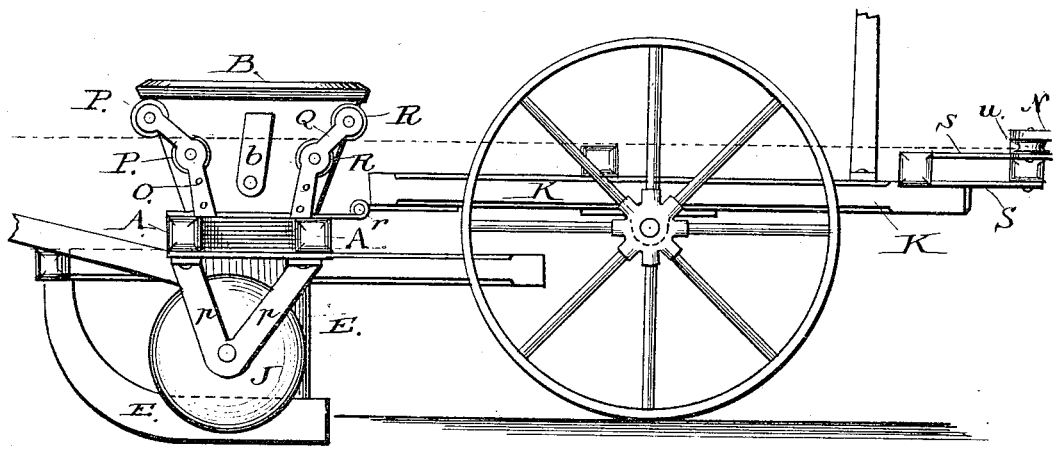
Figure 4:
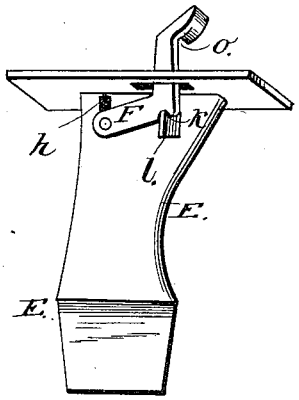
Figure 5:
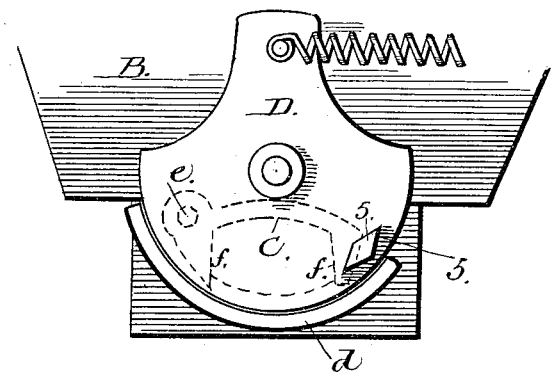
Figure 6:
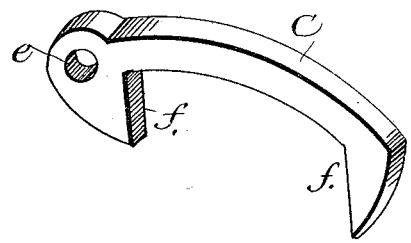
Figure 7:
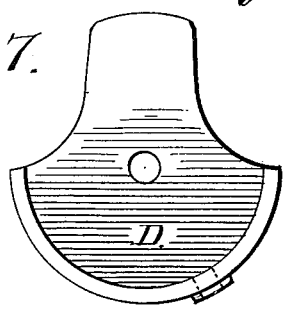
Figure 8:
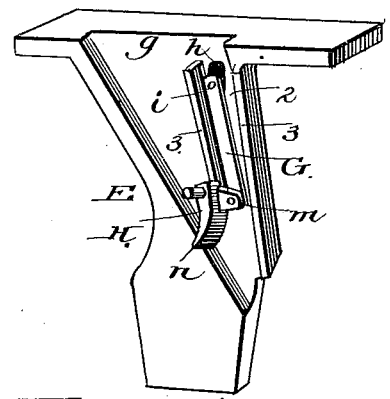

Figure 1 is a plan view of a corn or other planter with our improvements attached. Fig. 2 represents a cross-sectional view on line $x\,x$ of Fig. 1. Fig. 3 represents a side elevation of Fig. 1. Figs. 4, 5, 6, 7, and 8 are details of construction to be hereinafter referred to.

Our invention relates to certain improvements in corn-planters and in check-row attachments for the same, and it consists in the construction, arrangement, and combination of the several devices, all of which we will hereinafter fully set forth, and point out in the claims.

To enable others skilled in the art to make and use our invention we will now proceed to describe the exact manner in which we have carried it out.

In the said drawings, A represents the frame of the planter, which may be of ordinary construction and adapted to support the seed-boxes B. In many of the planters now in use a seed-slide is used and a mechanism employed to operate the seed-slide, to open and close the openings in the boxes and permit the corn or other grain to fall into runners located beneath and slightly in the rear of the said boxes. In the present case we dispense with the seed-slide and attach to each of the boxes a device which receives the grain and deposits it into suitable runners beneath the frame, but arranged at one side of the boxes.

To accomplish an even and systematic feed we journal within the boxes a shaft, $a$, upon each end of which are secured to oscillate slotted arms $b$, the purpose of which will be hereinafter fully set forth.

The seed-boxes B may be provided with curved bottom, and near their inner and lower surfaces with an opening, $c$, through which the grain passes, while curved plates $d$, (see Fig. 5,) located beneath the openings, receive the grain and discharge it into the runners through the medium of devices which we will hereinafter describe.

Pivoted to each of the boxes at $e$, and directly over the seed-openings, is what we term as a "cut-off." This device, which is designated by the letter C, has two downwardly-projecting lugs, $f$, (see Figs. 5 and 6,) which, fitting closely the face of the segmental plates D, prevent any more grains of corn from escaping into the runner than what is chambered in the openings of the plates.

Mounted upon the shaft $a$, and in close proximity to the seed-boxes, are the segmental plates D, each having deep flanges, which form chambers for the grain after it has left the boxes, and an opening formed in the flanges of these plates D enables the grain to pass into the runners at each oscillation of the shaft. These plates with their flanges, in conjunction with the cut-offs, permit of an even and systematic feed.

Secured by flanges to the frame of the machine are the runners E, each provided with a passage, $g$, which registers with the opening formed in the segmental plates, and each of the runners is provided with a slot, $h$, through which projects pin $i$, which furnishes a bearing for the bent levers F. These levers F are provided with notches $k$, and engage projections $l$, which act as fulcrums for the levers, and, with the slots $h$, permit the levers to be raised and lowered by each oscillation of the shaft and segmental plates.

Within the passage 2 formed by the flanges 3 and the sides of the runners are placed the pitmen G, the upper ends of which engage the pins $i$, while the lower ends are provided with journals for the short arms $m$ of the bent lever H, suitably fulcrumed in the sides of the runners, so that their lower ends, $n$, act as valves, which open and close the mouth of the passages $g$ at each oscillation of the plates D, and whenever the diamond-shaped projection 5 on the segmental plates comes in contact with the upper end of the levers F. To insure a perfect contact between the projections 5 and the levers F, the latter are formed with openings at $o$, between which the said projections pass in their movement back and forth.

To the under sides of the cross-bars of the frame are secured brackets $p$, which, with projections on the runner, furnish bearings for the short shafts I, upon which are mounted to revolve the disks J, arranged so that their front edges approach each other, to more effectually clean the ground, and plant the grain farther below the surface. This construction enables us to provide a device adapted to plant various grains in a simple and effective manner.

We will now proceed to describe our check-row attachment and the mechanism whereby the shaft $a$ and segmental plates D are caused to oscillate.

Clips $r$, or other suitable means, secured to the frame A, furnish bearings for a supplemental swinging frame, K, carrying a shaft upon which are mounted the supporting-wheels L, and upon the rear end of this frame K are attached plates $s$, between which is pivotally secured a cross-bar, M, provided at each end with short projections $t$, adapted to engage hollow hubs, formed on segmental pulley-carriers N, between the flanges of which are journaled one or more guide-pulleys, $u$, as shown in Fig. 1.

The segmental pulley-carriers N are placed on the cross-bar in a manner similar to that shown in Fig. 1, and short chains 7, attached to the cross-bar and to the frame, regulate the swing of the former.

A check-wire or other similar means provided with knots passes around the pulleys in the segmental arms or pulley-carriers N, and thence extends forward and passes between pulleys P, secured in a bracket or bearing, O; thence through the forked end of the arm $b$; thence between pulleys R in the bracket Q; and, finally, to a stake in the field.

As before stated, at each end of the cross-bar is a chain that permits the bar to swing round with one end near the planter, and at such an angle as is required to transfer the wire across the rows planted, without changing the relation of the knots on the wire to the hills planted—that is, if the knots on the wire in front of the planter are directly opposite the hills they must bear the same relation at the rear end. This is regulated by a simple change of the angle at which the lever stands when planting. When the rows are planted through to the end and the team is turned around to plant the other way, the lever reverses and the other end swings near the planter, the curved arms also reverse, the outer end swinging underneath, the wire can be again staked down without taking it out of the curved arms. Thus the wire is changed from side to side of the planter as the planter is turned around at the end of the rows, but is not removed from these curved arms on the ends of the lever.

The object of the pulleys in each curved arm is to remove the friction and also carry the wire around without making short bends in it.

Thus it is evident from the foregoing description we are enabled to construct a planter that will systematically feed a hill of grain, and by the arrangement of swinging bar, the wire, and the forked arm we are permitted to dispense with much of the mechanism commonly used in machines of this class.

Having thus fully described our invention, what we claim as new, and desire to secure by Letters Patent, is—

1. In a corn-planter, the frame A and boxes B, said boxes having side feed-openings, in combination with a rod passing transversely across the machine and through the boxes, and segmental plates mounted upon the rod on the outside of the boxes, so as to receive from the boxes and deposit into the runners a specified quantity of grain at each oscillation of the said shaft, substantially as described.

2. In a corn-planter, the frame A, in combination with seed-boxes having curved bottom, and with openings in their inner sides, a shaft or rod passing transversely across the machine and through the boxes, segmental plates with deep flanges mounted upon the rod to receive the grain from the boxes, and a check-wire for imparting an oscillating movement to said shaft and plates, substantially as described.

3. In corn or other planters, runners located at one side of the seed-boxes and provided with suitable passages for the grain, in combination with segmental plates located on the outside of the boxes for receiving grain from the boxes and depositing it into the runners, and a pivoted cut-off, substantially as herein described.

4. In corn-planters, the combination, with the oscillating shaft, the seed-boxes having side feed-apertures, and the segmental plates on the side of the boxes, of the runners E at one side of the boxes and provided with passages $g$, and valves within the passages adapted to open and close at each oscillation of the shaft, substantially as and for the purpose described.

5. In corn or other planters, the seed-boxes B, with curved bottoms and side outlets, in combination with a pivoted cut-off, segmental plates D on the outside of the boxes, arms $b$, a transverse shaft, $a$, and a wire or other similar device for oscillating the plates, for the purpose herein set forth.

6. In a planter, the runners E, located at one side of the seed-boxes with their passages and slots, the valves pivoted in the runners, the pitmen G, and the bent levers provided with notches for engaging projecting studs, in combination with segmental plates on the outside of the boxes, with projections 5 for engaging the upper slotted end of the bent levers to open and close the valves at each oscillation of the plates, substantially as described, and for the purpose specified.

7. In a planter, the frame A, seed-boxes B, and runners E, located at one side of the boxes, in combination with the V-shaped depending brackets $p$, the independent shafts journaled in the brackets and in sides of the runners, and concave disks J, mounted upon the shafts I so that their forward edges approach each other, substantially as described.

8. In a planter, the frame A, in combination with the supplemental frame K, carrying the wheels, and a swinging bar pivoted within the flanges s, substantially as described.

9. In a planter, the swinging cross-bar pivoted at or near its center to a supplemental frame, and one or more pulleys on each end of said cross-bar, substantially as described.

10. In a planter, the swinging cross-bar, in combination with the reversible arms carrying one or more pulleys, substantially as described.

11. In a planter, the swinging cross-bar provided with short shafts, in combination with curved reversible arms having hubs fitting the shafts and pulleys mounted in the arms, substantially as described.

AUSTIN S. HOUCK.
EDWIN HOUCK.

Witnesses:
JAS. P. FLICK,
E. L. KELSO.